(12) United States Patent
Luo et al.

(10) Patent No.: US 11,022,170 B2
(45) Date of Patent: Jun. 1, 2021

(54) ROTATING SHAFT MECHANISM

(71) Applicants: Sintai Optical (Shenzhen) Co., Ltd., ShenZhen (CN); Asia Optical Co., Inc., Taichung (TW)

(72) Inventors: Sheng Luo, ShenZhen (CN); Lian Zhao, ShenZhen (CN); Hua-Tang Liu, Taichung (TW); Yue-Ye Chen, ShenZhen (CN); Ke-Yu Qiu, ShenZhen (CN); Jia-Jun Cao, ShenZhen (CN)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 676 days.

(21) Appl. No.: 15/822,377

(22) Filed: Nov. 27, 2017

(65) Prior Publication Data
US 2018/0258981 A1 Sep. 13, 2018

(30) Foreign Application Priority Data
Mar. 8, 2017 (CN) .......................... 201710133860.6

(51) Int. Cl.
*F16C 11/10* (2006.01)
*F16C 11/04* (2006.01)
(Continued)

(52) U.S. Cl.
CPC ............ *F16C 11/04* (2013.01); *F16C 11/103* (2013.01); *G02B 7/06* (2013.01); *G02B 23/18* (2013.01);
(Continued)

(58) Field of Classification Search
CPC .. G02B 7/06; G02B 7/12; G02B 23/18; Y10T 403/32861; Y10T 403/32918; Y10T 403/32926; F16C 11/103
See application file for complete search history.

(56) References Cited

U.S. PATENT DOCUMENTS 712,113 A * 10/1902 Bausch et al. ........... G02B 7/06
905,979 A * 12/1908 Bausch .................... G02B 7/06
(Continued)

FOREIGN PATENT DOCUMENTS

CN 201522579 U 7/2010
CN 102758837 A 10/2012
(Continued)

OTHER PUBLICATIONS

Translation of FR 1 128 108. worldwide.espacenet.com. Jun. 18, 2020.*

*Primary Examiner* — Michael P Ferguson
(74) *Attorney, Agent, or Firm* — McClure, Qualey & Rodack, LLP

(57) ABSTRACT

A rotating shaft mechanism includes a first connecting portion, a second connecting portion, a central shaft rotatably connected to the first connecting portion and the second connecting portion, and an adjusting unit disposed on the central shaft. The adjusting unit includes an adjusting ring disposed around the central shaft, a first washer disposed around the central shaft and configured to generate a force to the first connecting portion or the second connecting portion. A position of the adjusting ring with respect to the central shaft is axially adjustable for adjusting the force so that the first connecting portion or the second connecting portion is rotatable or fixed relative to the central shaft.

18 Claims, 3 Drawing Sheets

(51) Int. Cl.
  *G02B 23/18*  (2006.01)
  *G02B 7/06*   (2021.01)
  *F16B 43/00*  (2006.01)

(52) U.S. Cl.
  CPC ..... *F16B 43/002* (2013.01); *Y10T 403/32918* (2015.01)

(56) References Cited

U.S. PATENT DOCUMENTS

| | | | | |
|---|---|---|---|---|
| 4,568,155 A * | 2/1986 | Shimizu | ................ | G02B 23/18 |
| | | | | 359/414 |
| 4,848,887 A * | 7/1989 | Addy | ................ | G02B 7/06 |
| | | | | 359/413 |
| 5,191,471 A | 3/1993 | Funathu | | |
| 5,305,141 A | 4/1994 | Hotta | | |
| 5,615,044 A * | 3/1997 | Dross | ................ | G02B 7/06 |
| | | | | 359/414 |
| 7,315,415 B2 | 1/2008 | Shih-Yu et al. | | |
| 7,330,310 B2 * | 2/2008 | Hengst | ................ | G02B 7/04 |
| | | | | 359/418 |
| 10,088,648 B2 * | 10/2018 | Yamamoto | ................ | G02B 7/12 |

FOREIGN PATENT DOCUMENTS

| | | | | |
|---|---|---|---|---|
| CN | 204009223 U | 12/2014 | | |
| CN | 204061529 U | 12/2014 | | |
| CN | 204572755 U | 8/2015 | | |
| DE | 19519302 C1 | 8/1996 | | |
| FR | 1 128 108 | * | 1/1957 | ............... G02B 7/12 |
| JP | 58-149010 | * | 9/1983 | ............... G02B 7/06 |
| JP | 7-209589 A | 8/1995 | | |
| JP | 4031394 A | 12/2004 | | |
| JP | 4925678 A | 8/2007 | | |
| TW | I281553 A | 10/2006 | | |
| WO | 2013147180 A1 | 12/2015 | | |

* cited by examiner

ROTATING SHAFT MECHANISM

BACKGROUND OF THE INVENTION

Field of the Invention

The invention relates to a rotating shaft mechanism, and more particularly to a rotating shaft mechanism which is adjustable to change the magnitude of a twisting force required for operation thereof.

Description of the Related Art

Generally, an apparatus (e.g. binocular telescope or binocular rangefinder) that is provided with a rotating shaft mechanism includes a central shaft, a left body tube and a right body tube. The left body tube and the right body tube are rotatable relative to each other about the central shaft for adjusting a distance (corresponding to a distance between user's eyes) therebetween. However, the magnitude of a twisting force required to operate the rotating shaft mechanism is constant. That is inconvenient in operation.

BRIEF SUMMARY OF THE INVENTION

The invention provides an apparatus which includes a rotating shaft mechanism. The rotating shaft mechanism is provided with an adjusting ring. The adjusting ring is configured to increase or reduce frictional forces (or amount of interference) within the rotating shaft mechanism so as to adjust the magnitude of a twisting force required to operate the rotating shaft mechanism.

The apparatus in accordance with an embodiment of the invention includes a first body including a first connecting portion, a second body including a second connecting portion, a central shaft rotatably connected to the first connecting portion and the second connecting portion, and an adjusting unit disposed on the central shaft. The adjusting unit includes an adjusting ring disposed around the central shaft, a first washer disposed around the central shaft and configured to generate a force to the first body or the second body. A position of the adjusting ring with respect to the central shaft is axially adjustable for adjusting the force so that the first body or the second body is rotatable or fixed relative to the central shaft.

In another embodiment, the first body includes a groove, and the groove is covered by the first washer to form a gap.

In yet another embodiment, the second body includes a groove, and the groove is covered by the first washer to form a gap.

In another embodiment, the first washer is an elastic washer.

In yet another embodiment, the first washer is made of nylon.

In another embodiment, the adjusting unit further includes a second washer disposed around the central shaft and against the first washer.

In yet another embodiment, the first body includes a groove, and the groove is covered by the second washer to form a gap.

In another embodiment, the second body includes a groove, and the groove is covered by the second washer to form a gap.

In yet another embodiment, the second washer is a non-elastic washer.

In another embodiment, the second washer is made of metal.

In yet another embodiment, the adjusting unit further includes a fixing seat disposed around the central shaft and configured to receive the first washer.

In another embodiment, the adjusting unit further includes at least one elastic washer disposed around the central shaft and against the adjusting ring, and the position of the adjusting ring with respect to the central shaft is axially adjustable so as to compress or release the elastic washer.

In yet another embodiment, the elastic washer is a disc washer, a Belleville washer or a conical washer.

In another embodiment, the rotating shaft mechanism further includes at least one friction washer disposed around the central shaft and against the first connecting portion and the second connecting portion.

The rotating shaft mechanism in accordance with an embodiment of the invention includes a first connecting portion, a second connecting portion, a central shaft rotatably connected to the first connecting portion and the second connecting portion, and an adjusting unit disposed on the central shaft. The adjusting unit includes an adjusting ring disposed around the central shaft, a first washer disposed around the central shaft and configured to generate a force to the first connecting portion or the second connecting portion. A position of the adjusting ring with respect to the central shaft is axially adjustable for adjusting the force so that the first connecting portion or the second connecting portion is rotatable or fixed relative to the central shaft.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
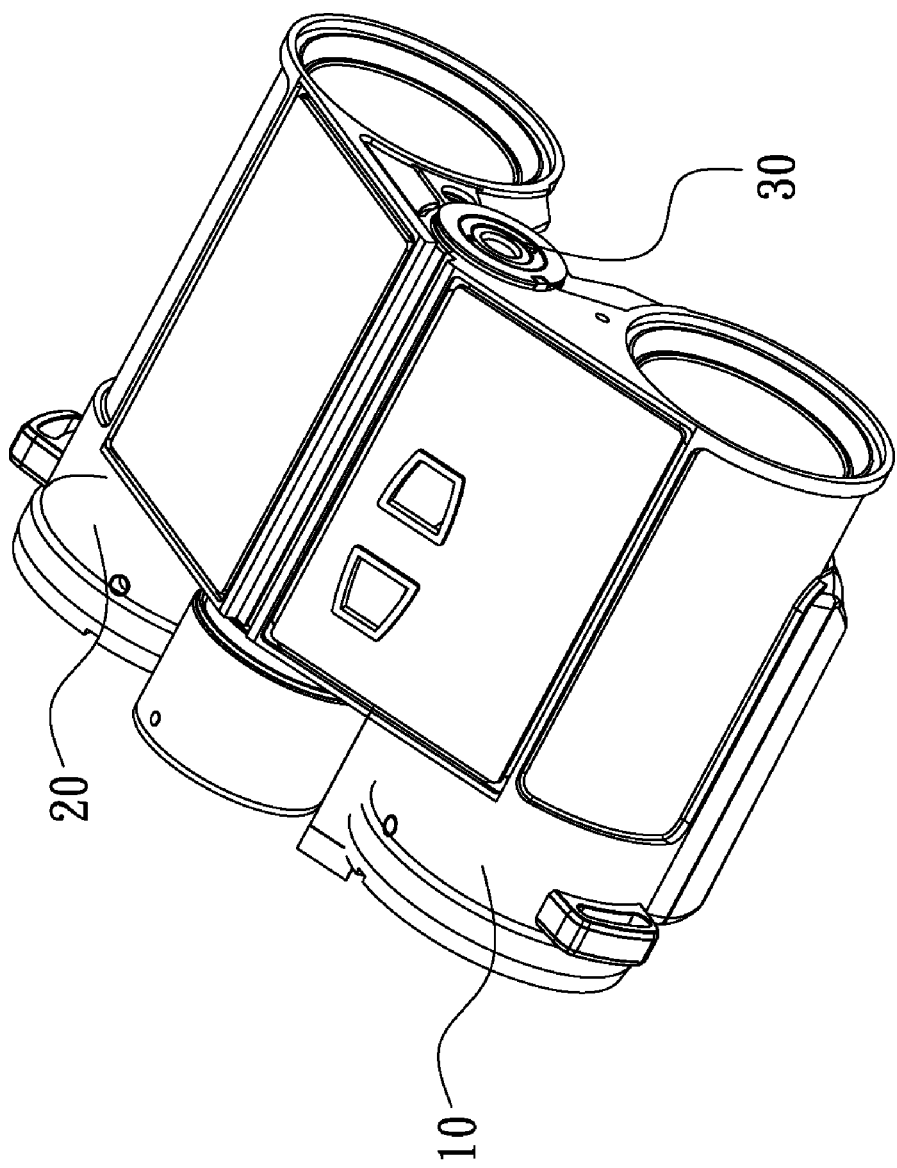
FIG. 1 is a schematic view of an apparatus provided with a rotating shaft mechanism in accordance with an embodiment of the invention.
Figure 2:
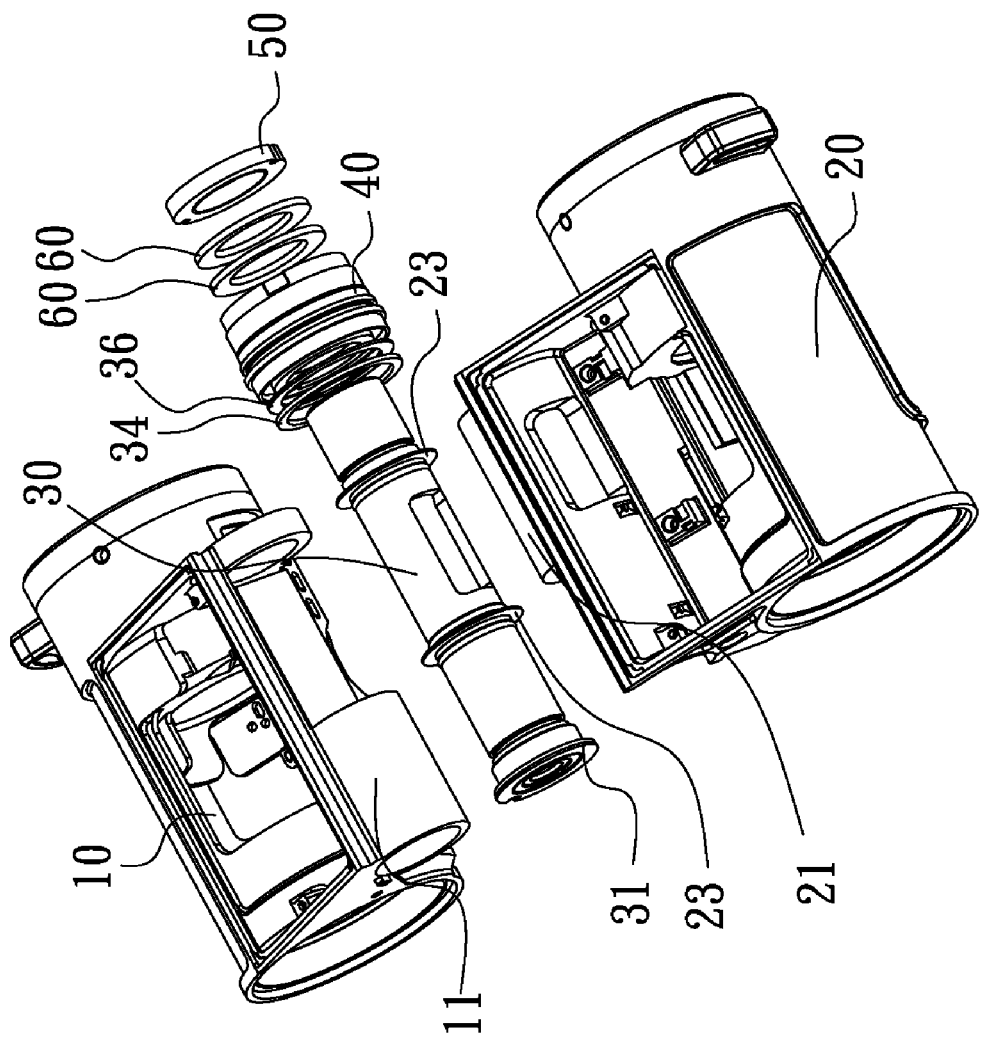
FIG. 2 is a exploded view of an apparatus provided with a rotating shaft mechanism in accordance with an embodiment of the invention.

Referring to FIGS. 1 and 2, an apparatus 1 in accordance with an embodiment of the invention includes a first body 10, a second body 20, a central shaft 30, a first washer 36, a second washer 34, a fixing seat 40, an adjusting ring 50, at least one friction washer 23 and at least one elastic washer 60. The first body 10 and the second body 20 is configured to rotate with respect to each other through the central shaft 30. In operation, a position of the adjusting ring 50 with respect to the central shaft 30 is axially adjustable for adjusting frictional forces between the other elements mentioned above so as to change the magnitude of a twisting force required for rotating the first body 10 and/or the second body 20 of the apparatus 1.

The first body 10 includes a first connecting portion 11, and the second body 20 includes a second connecting portion 21. The central shaft 30 is rotatably penetrated through the first connecting portion 11 and the second connecting portion 21 so that the first body 10 can be rotated within an angle relative to the second body 20 through the first connecting portion 11 and the central shaft 30. Similarly, the second body 20 is configured to rotate within another angle relative to the first body 10 through the second connecting portion 21 and the central shaft 30. Two friction washers 23 are respectively disposed around the central shaft 30, and each of the friction washers 23 is placed against the first connecting portion 11 and the second connecting portion 21. Specifically, the first connecting portion 11 includes a first through hole, and the second connecting portion 21 includes a second through hole (not shown). The central shaft 30 is penetrated through the first through hole and the second through hole to be connected to the first connecting portion 11 and the second connecting portion 21. In the present embodiment, the apparatus 1 is, but not limited to, a binocular telescope. The first body 10 is a left portion of the binocular telescope, and the second body 20 is a right portion of the binocular telescope. The first connecting portion 11 is a concave portion, and the second connecting portion 21 is a convex portion. It is worth noting that the first connecting portion 11 and the second connecting portion 21 are not limited to a concave portion and a convex portion. Any shapes enabling the first connecting portion 11 and the second connecting portion 21 to match each other are acceptable.

The central shaft 30 includes a first end and a second end. As shown in FIG. 2, the first end of the central shaft 30 is provided with a limiting portion 31. The limiting portion 31 is placed against an end surface of the first connecting portion 11 when the second end of the central shaft 30 passes through the first connecting portion 11, the friction washers 23 and the second connecting portion 21. Moreover, the fixing seat 40 is provided with an annular indentation, and the first washer 36 and the second washer 34 are disposed in the annular indentation. The second end of the central shaft 30 passes through the second washer 34, the first washer 36, the fixing seat 40 and two elastic washers 60. Then, the adjusting ring 50 is disposed around the central shaft 30 for fixing the second washer 34, the first washer 36, the fixing seat 40 and the elastic washers 60 thereto. By such arrangement, the second washer 34 is pushed against the second body 20.

Figure 3:
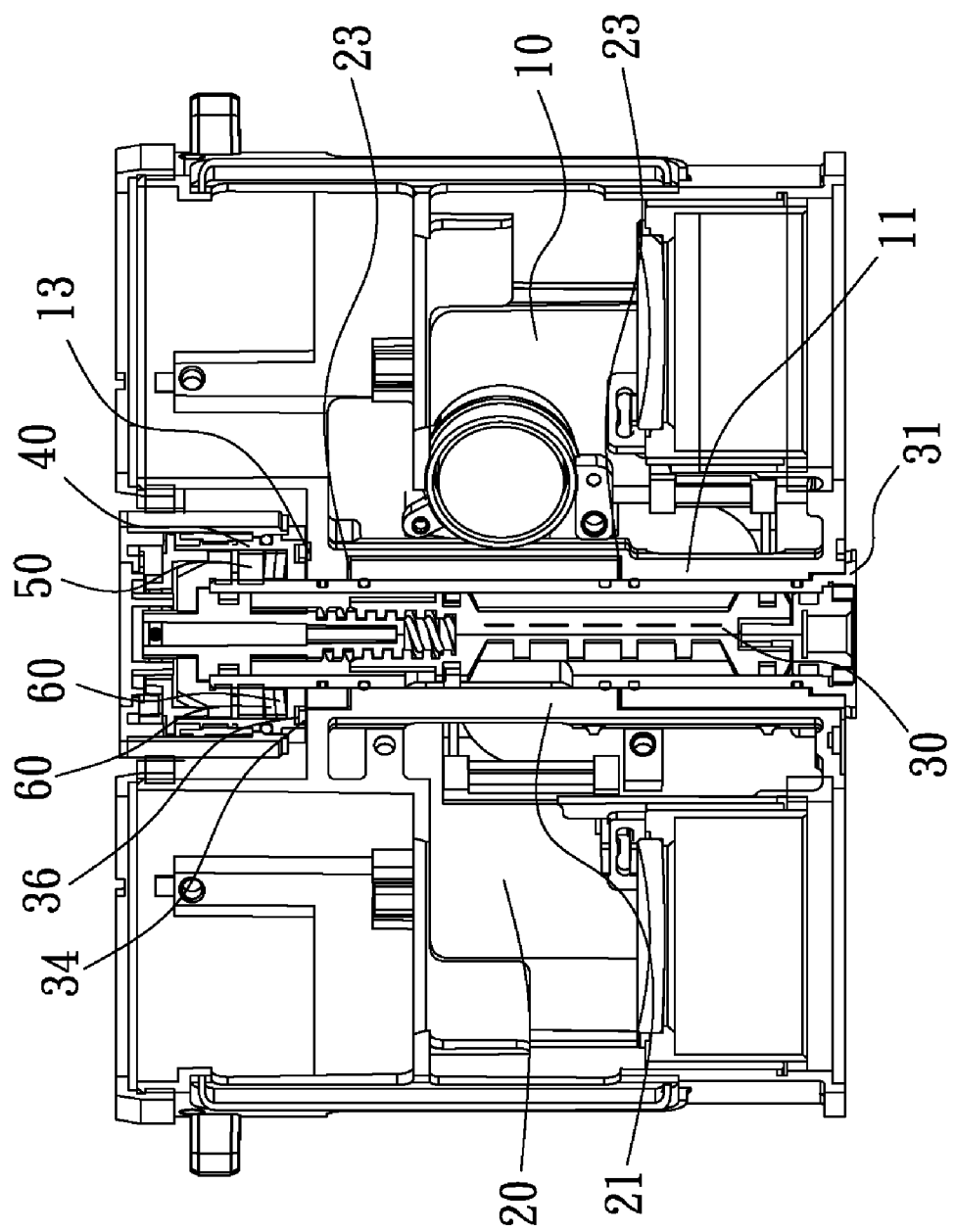
FIG. 3 is a sectional view of an apparatus provided with a rotating shaft mechanism in accordance with an embodiment of the invention.

Referring to FIG. 3, the first body 10 is provided with a groove 13 corresponding to the second washer 34. When the second washer 34, the first washer 36, the fixing seat 40 and the elastic washers 60 are fixed to the central shaft 30 by the adjusting ring 50, the second washer 34 is pushed against the second body 20. Also, the second washer 34 is not pushed against the first body 10 but placed to cover the groove 13 of the first body 10 so as to form a gap. By such arrangement, the second washer 34 and the second body 20 are not capable of rotating relative to each other as the adjusting ring 50 is firmly fixed to the central shaft 30. However, the first body 10 is capable of rotating about the central shaft 30 relative to the second body 20 since the gap exists between the second washer 34 and the first body 10. In the present embodiment, the second washer 34 is a non-elastic washer such as a metallic washer, and the first washer 36 is an elastic washer such as a nylon washer.

The central shaft 30, the fixing seat 40, the adjusting ring 50, the first connecting portion 11, the second connecting portion 21, the friction washers 23, the first washer 36, the second washer 34 and the elastic washers 60 constitute a rotating shaft mechanism. When changing the magnitude of the twisting force required for rotating the rotating shaft mechanism is desired, the adjusting ring 50 is operated to adjust a prestressing force applied to the elements disposed around the central shaft 30 thereby increasing or reducing the frictional forces therebetween (between side surfaces of the elements disposed around the elements). Specifically, when increasing the magnitude of the twisting force is desired, the adjusting ring 50 is moved along the central shaft 30 and is firmly fixed so that the elastic washers 60 are compressed to generate an axial stress on the first washer 36 and the second washer 34. Thus, the frictional force between the first washer 36, the second washer 34 and the second body 20 is increased to prevent the second washer 34 and the second body 20 from rotating relative to each other. Meanwhile, first interference is generated between the first body 10, the friction washers 23 and the second body 20, and second interference is generated between the fixing seat 40, the first washer 36 and the second washer 34. Thus, the magnitude of the twisting force required for rotating the first body 10 and the second body 20 relative to each other is increased due to the first interference and the second interference. In the present embodiment, each of the elastic washers 60 is a disc washer, a Belleville washer or a conical washer.

In addition, the adjusting ring 50 is provided with inner threads (not shown), and the second end of the central shaft 30 is provided with outer threads (not shown). Therefore, the adjusting ring 50 can be firmly fixed in a predetermined position on the central shaft 30 by mating the inner threads with the outer threads. In another embodiment, the adjusting ring (not shown) is not provided with the inner threads. On the other hand, a fixing element (not shown) is provided with the inner threads through which the adjusting ring is firmly fixed in the predetermined position on the central shaft 30. It is understood that any structure provided with the function of firmly fixing the adjusting ring 50 in the predetermined position on the central shaft 30 is acceptable.

In yet another embodiment, the friction washers 23 and the second washer 34 are omitted. In other words, no friction washers are provided between the first connecting portion 11 and the second connecting portion 21, and no second washer is disposed on the fixing seat 40. Instead, third interference is generated between the first body 10 and the second body 20, and fourth interference is generated between the fixing seat 40 and the first washer 36, when the adjusting ring 50 is firmly fixed on the central shaft 30. By means of the third interference and the fourth interference, the magnitude of the twisting force required for rotating the first body 10 and the second body 20 relative to each other is increased.

During operation, the magnitude of the twisting force required to rotate the rotating shaft mechanism is determined by the axial force between a first end surface of the first body 10 and a second end surface of the second body 20 corresponding to the first end surface, and the prestressing force of the adjusting ring 50 for compressing or releasing the elements disposed around the central shaft 30, wherein the prestressing force of the adjusting ring 50 is adjustable to set the magnitude of the required twisting force. In practical application, the apparatus 1 can be a binocular telescope or any of apparatuses provided with a structure rotatably about a central shaft so as to promoting the operating flexibility of the apparatus.

What is claimed is:
1. An apparatus, comprising:
a first body comprising a first connecting portion laterally-extending therefrom, a distal end of the first connecting portion having a first hole extending therethrough and a recessed portion defined within an upper surface of the first connecting portion, concentric with and surrounding the first hole;

a second body comprising a second connecting portion laterally-extending therefrom, a distal end of the second connecting portion having a second hole extending therethrough which is axially-aligned with the first hole, wherein a groove is defined within an upper surface of the second connecting portion, concentric with and surrounding the second hole, and wherein the second connecting portion is seated within the recessed portion of the first connecting portion such that the upper surfaces of the first and second connecting portions are flush with each other;

a central shaft extending through the aligned holes of the first and second connecting portions, the central shaft rotatably received therein and defining a pivot axis; and an adjusting unit disposed on the central shaft, comprising:

an adjusting ring disposed around the central shaft on a side facing the upper surfaces of the first and second connecting portions;

a fixing seat disposed around the central shaft between the adjusting ring and the first and second connecting portions;

a first washer disposed around the central shaft between the fixing seat and the first and second connecting portions; and a second washer disposed around the central shaft and against the first washer on a side facing the first and second connecting portions, the second washer engaging the upper surface of the first connecting portion between the recessed portion and the first body and engaging the upper surface of the second connecting portion surrounding the groove;

wherein a position of the adjusting ring with respect to the central shaft is axially adjustable to apply pressure to the fixing seat and the first and second washers along the pivot axis towards the first and second connecting portions such that the second washer frictionally engages the upper surfaces of the first and second connecting portions to prevent relative rotation between the first and second bodies about the pivot axis.

2. The apparatus as claimed in claim 1, wherein the groove is covered by the second washer to form a gap.

3. The apparatus as claimed in claim 1, wherein the second washer is a non-elastic washer.

4. The apparatus as claimed in claim 1, wherein the second washer is made of metal.

5. The apparatus as claimed in claim 1, wherein the first washer is an elastic washer.

6. The apparatus as claimed in claim 1, wherein the first washer is made of nylon.

7. The apparatus as claimed in claim 1, wherein the fixing seat is configured to receive the first washer.

8. The apparatus as claimed in claim 1, wherein the adjusting unit further comprises at least one elastic washer disposed around the central shaft and between the adjusting ring and the fixing seat, and the position of the adjusting ring with respect to the central shat is axially adjustable so as to compress or release the elastic washer.

9. The apparatus as claimed in claim 8, wherein the elastic washer is a disc washer, a Belleville washer or a conical washer.

10. The apparatus as claimed in claim 1, further comprising at least one friction washer disposed around the central shaft and between the first connecting portion and the second connecting portion.

11. An apparatus, comprising:
a first body comprising a first connecting portion laterally-extending therefrom, a distal end of the first connecting portion having a first hole extending therethrough and a recessed portion defined within an upper surface of the first connecting portion, concentric with and surrounding the first hole;

a second body comprising a second connecting portion laterally-extending therefrom, a distal end of the second connecting portion having a second hole extending therethrough which is axially-aligned with the first hole, wherein a groove is defined within an upper surface of the second connecting portion, concentric with and surrounding the second hole, and wherein the second connecting portion is seated within the recessed portion of the first connecting portion such that the upper surfaces of the first and second connecting portions are flush with each other;

a central shaft extending through the aligned holes of the first and second connecting portions, the central shaft rotatably received therein and defining a pivot axis; and an adjusting unit disposed on the central shaft, comprising:

an adjusting ring disposed around the central shaft on a side facing the upper surfaces of the first and second connecting portions;

a first washer disposed around the central shaft between the adjusting ring and the first and second connecting portions; and a second washer disposed around the central shaft and against the first washer on a side facing the first and second connecting portions, the second washer engaging the upper surface of the first connecting portion between the recessed portion and the first body and engaging the upper surface of the second connecting portion surrounding the groove;

wherein a position of the adjusting ring with respect to the central shaft is axially adjustable to apply pressure to the first and second washers along the pivot axis towards the first and second connecting portions such that the second washer frictionally engages the upper surfaces of the first and second connecting portions to form a static disposition therewith and to prevent relative rotation between the first and second bodies about the pivot axis.

12. The apparatus as claimed in claim 11, wherein the adjusting unit further comprises a fixing seat disposed around the central shaft and configured to receive the first washer.

13. The apparatus as claimed in claim 12, wherein the adjusting unit further comprises at least one elastic washer disposed around the central shaft and between the adjusting ring and the fixing seat, and the position of the adjusting ring with respect to the central shaft is axially adjustable so as to compress or release the elastic washer.

14. The apparatus as claimed in claim 13, wherein the elastic washer is a disc washer, a Belleville washer or a conical washer.

15. The apparatus as claimed in claim 11, further comprising at least one friction washer disposed around the central shaft and between the first connecting portion and the second connecting portion.

16. An apparatus, comprising:
a first body comprising a first connecting portion laterally-extending therefrom, a distal end of the first connecting portion having a first hole extending therethrough and a recessed portion defined within an upper surface of the first connecting portion, concentric with and surrounding the first hole;

a second body comprising a second connecting portion laterally-extending therefrom, a distal end of the second connecting portion having a second hole extending therethrough which is axially-aligned with the first hole, wherein a partially annular groove is defined within an upper surface of the second connecting portion, concentric with and surrounding the second hole, and wherein the second connecting portion is seated within the recessed portion of the first connecting portion such that the upper surfaces of the first and second connecting portions are flush with each other;

a central shaft extending through the aligned holes of the first and second connecting portions, the central shaft rotatably received therein and defining a pivot axis; and an adjusting unit disposed on the central shaft, comprising:

an adjusting ring disposed around the central shaft on a side facing the upper surfaces of the first and second connecting portions;

a fixing seat disposed around the central shaft between the adjusting ring and the first and second connecting portions;

a first washer disposed around the central shaft between the fixing seat and the first and second connecting portions; and a second washer disposed around the central shaft and against the first washer on a side facing the first and second connecting portions, the second washer engaging the upper surface of the first connecting portion between the recessed portion and the first body and engaging the upper surface of the second connecting portion surrounding the groove;

wherein a position of the adjusting ring with respect to the central shaft is axially adjustable to apply pressure to the fixing seat and the first and second washers along the pivot axis towards the first and second connecting portions such that the first washer urges the second washer to frictionally engage the upper surfaces of the first and second connecting portions to form a static disposition therewith and to prevent relative rotation between the first and second bodies about the pivot axis.

17. The apparatus as claimed in claim 16, wherein the second washer is a non-elastic washer.

18. The apparatus as claimed in claim 16, wherein the second washer is made of metal.

\* \* \* \* \*